(12) United States Patent (10) Patent No.: US 9,379,768 B2
Moffatt et al. (45) Date of Patent: Jun. 28, 2016

(54) COMMUNICATION SYSTEM WITH NARROWBAND INTERFERENCE MITIGATION AND RELATED METHODS

(71) Applicant: HARRIS CORPORATION, Melbourne, FL (US)

(72) Inventors: Christopher D. Moffatt, Palm Bay, FL (US); John Hoffmann, Indialantic, FL (US); Richard Lilley, Grant, FL (US); David M. Browning, West Melbourne, FL (US)

(73) Assignee: HARRIS CORPORATION, Melbourne, FL (US)

( * ) Notice: Subject to any disclaimer, the term of this patent is extended or adjusted under 35 U.S.C. 154(b) by 40 days.

(21) Appl. No.: 14/169,447

(22) Filed: Jan. 31, 2014

(65) Prior Publication Data

US 2015/0222322 A1 Aug. 6, 2015

(51) Int. Cl.
*H04B 1/00* (2006.01)
*H04B 1/715* (2011.01)
*H04J 11/00* (2006.01)
*H04L 27/26* (2006.01)
*H04L 25/03* (2006.01)
*H04L 5/00* (2006.01)

(52) U.S. Cl.
CPC ............ *H04B 1/715* (2013.01); *H04J 11/0066* (2013.01); *H04L 5/0012* (2013.01); *H04L 5/0073* (2013.01); *H04L 25/03057* (2013.01); *H04L 27/265* (2013.01); *H04L 27/2647* (2013.01); *H04B 2001/7152* (2013.01)

(58) Field of Classification Search
CPC ......... H04B 1/71; H04B 1/7107; H04B 7/216
See application file for complete search history.

(56) References Cited

U.S. PATENT DOCUMENTS

| 6,115,409 | A | 9/2000 | Upadhyay et al. | |
|---|---|---|---|---|
| 6,531,976 | B1 * | 3/2003 | Yu | G01S 7/2813 342/128 |
| 6,975,673 | B1 * | 12/2005 | Rouquette | H04B 1/7102 375/145 |
| 7,039,417 | B2 | 5/2006 | Lyle et al. | |
| 7,340,000 | B1 | 3/2008 | Hart et al. | |
| 7,483,711 | B2 | 1/2009 | Burchfiel | |
| 8,041,363 | B2 * | 10/2011 | Burchfiel | 455/452.1 |
| 8,190,093 | B2 | 5/2012 | Burchfiel | |
| 8,494,534 | B2 | 7/2013 | Burchfiel | |
| 2004/0092281 | A1 | 5/2004 | Burchfiel | |
| 2008/0043861 | A1 * | 2/2008 | Moffatt | 375/260 |
| 2008/0075033 | A1 | 3/2008 | Shattil | |
| 2008/0170554 | A1 * | 7/2008 | Wang | H04B 1/7105 370/342 |
| 2009/0310586 | A1 | 12/2009 | Shatti | |
| 2009/0312028 | A1 | 12/2009 | Burchfiel | |
| 2010/0136941 | A1 * | 6/2010 | Lackey | H04B 1/525 455/307 |
| 2011/0286497 | A1 * | 11/2011 | Nervig | 375/147 |
| 2012/0064928 | A1 | 3/2012 | Burchfiel | |
| 2012/0269067 | A1 | 10/2012 | Burchfiel | |

* cited by examiner

*Primary Examiner* — Shuwang Liu
*Assistant Examiner* — Sung Ahn
(74) *Attorney, Agent, or Firm* — Allen, Dyer, Doppelt, Milbrath & Gilchrist, P.A.

(57) ABSTRACT

A communications device may include a wireless receiver, and a processor coupled to the wireless receiver. The processor may be configured to receive a spread OFDM signal having narrowband interference associated with the same, the spread OFDM signal having subcarriers with data distributed among the subcarriers. The processor may be configured to excise the narrowband interference from the spread OFDM signal, and despread the spread OFDM signal after excising and based upon the excising to recover the data.

23 Claims, 9 Drawing Sheets

COMMUNICATION SYSTEM WITH NARROWBAND INTERFERENCE MITIGATION AND RELATED METHODS

FIELD OF THE INVENTION

The present invention relates to the field of communications, and, more particularly, to interference compensation and related methods.

BACKGROUND OF THE INVENTION

As wireless communications has become prevalent in society, it is not uncommon for two wireless communications devices to interfere with the operation of each other when operating within transmission range of each other. Indeed, this type of interference has become more frequent with increasing wireless connectivity permeating society, such as, cellular phones and mobile email devices. For example, when IEEE 802.11b (WiFi) wireless devices, for example, laptop computers, became readily available to the home consumer, "cordless" home telephones were capable of rendering the WiFi devices inoperable due to interference.

Interference is typically categorized into two types: narrowband interference and wideband interference. Narrowband interference includes forms of interference that are concentrated around a relatively small frequency bandwidth. Several common approaches to compensating for narrowband interference may include, for example, forward error correction (FEC), baseband coding (FHSS/DSSS spread spectrum), diversity in frequency and/or time, and signal cancellation.

Differently, wideband interference includes forms of interference that are spread out across a relatively large frequency bandwidth. Several common approaches to compensating for wideband interference may include, for example, FEC, adaptive data rate (modulation and channel bandwidth), adaptive power control, diversity in frequency and/or time, and signal cancellation.

Another common type of interference is self interference. Common causes of self interference may include, for example, collocation or frequency reuse. In particular, collocation may be caused by two wireless communication systems being deployed too closely together while frequency reuse may be caused by two wireless communication systems using the same frequency band/channel. Several approaches to compensating for self interference, which are available during planning and development stages of wireless communication systems, include, for example, installation (isolation between antennas), frequency planning, antenna pattern manipulation, synchronization of transmitters, and filtering (duplexing).

Although interference is commonly generated inadvertently, another frequent source may be intentionally created by an unauthorized user, e.g. an interferer. Indeed, similar to the cordless home telephone, the unauthorized user may render a wireless communication system inoperable or may reduce the effectiveness, for example, capacity, of the wireless communication system.

Regardless of the source, there is a desire to reduce the effect of interference in communications. An approach to interference in wireless communication systems may be interference compensation. For example, frequency diversity may be used to compensate for the interference by adjusting the operating frequency of the wireless communications device to a frequency free of the interference. Another approach to interference compensation is spatial diversity using a plurality of antennas. In this approach, the undesired interference is canceled out using the time shifted variants received at each antenna.

Another approach to interference compensation is disclosed in U.S. Pat. No. 6,115,409 to Upadhyay et al. This system includes an array of antennas for spatial diversity. The system uses the spatial diversity to attempt to cancel out the interference. Moreover, the system uses spatial and temporal filters to cancel out wideband and narrowband interference in the antenna array.

Another approach to interference compensation is disclosed in U.S. Pat. No. 7,039,417 to Lyle et al. The system of Lyle et al. cycles through available channels and evaluates the presence of interference on each channel. The system may also determine the type of electronic device causing the interference, i.e. a cell phone or a microwave. The system assigns a quality-of-service parameter for the channel and moves on to the next channel. Using the table of service parameters for each available channel, the system may select a channel that is interference free or subject to low levels of interference. In other words, this system uses frequency diversity to compensate for interference.

Another approach to interference compensation is disclosed in United States Patent Application Publication No. 2008/0043861 to Moffatt, which is assigned to the present application's assignee, the contents of which are hereby incorporated by reference in their entirety. This approach comprises a device for communicating data, comprising a modulation and mapping circuit that modulates and maps data symbols into a plurality of multiple subcarrier frequencies that are orthogonal to each other to form an Orthogonal Frequency Division Multiplexed (OFDM) communications signal based on a fixed or variable OFDM symbol rate. A pseudo-random signal generator is operative with the modulation and mapping circuit for generating pseudo-random signals to the modulation and mapping circuit based on an encryption algorithm for frequency hopping each subcarrier at an OFDM symbol rate to lower probability of interception and detection, reduce power per frequency (dB/Hz/sec), and lower any required transmission power while maintaining an instantaneous signal-to-noise ratio.

SUMMARY OF THE INVENTION

In view of the foregoing background, it is therefore an object of the present invention to provide a communications device/system that has robust interference mitigation.

This and other objects, features, and advantages are provided by a communications device comprising a wireless receiver, and a processor coupled to the wireless receiver and configured to receive a spread OFDM signal having narrowband interference associated therewith. The spread OFDM signal may include a plurality of subcarriers with data distributed among the subcarriers. The processor may be configured to excise the narrowband interference from the spread OFDM signal, and despread the spread OFDM signal after excising and based upon the excising to recover the data. Advantageously, the communications device may reduce the impact of narrowband interference in the spread OFDM signal.

Additionally, the processor may be configured to equalize the spread OFDM signal also based upon the excising. The processor may be configured to respread the excised OFDM signal before the equalizing. The processor may be configured to equalize the spread OFDM signal using decision feedback equalization.

In some embodiments, the communications device may further comprise a decoder coupled to the processor. The processor may be configured to perform a frequency transformation on the spread OFDM signal so that the spread OFDM signal is processed in a plurality of frequency bins.

Also, the processor may be configured to excise the narrowband interference by setting at least one frequency bin to a set value. In particular, the set value may comprise one of a zero value, a mean value, and a random value. The spread OFDM signal may be based upon Walsh coding.

Another aspect is directed to a communication system that may comprise a first communications device comprising a wireless transmitter, and a processor coupled to the wireless transmitter and configured to transmit a spread OFDM signal, and a second communications device communicating with the first communications device over a communication channel and comprising a wireless receiver, and a processor coupled to the wireless receiver. The processor of the second communications device may be configured to receive the spread OFDM signal having narrowband interference associated therewith from the communication channel, the spread OFDM signal comprising a plurality of subcarriers with data distributed among the subcarriers, excise the narrowband interference from the spread OFDM signal, and despread the spread OFDM signal after excising and based upon the excising to recover the data.

Another aspect is directed to a method of operating a communications device comprising a wireless receiver, and a processor coupled to the wireless receiver. The method may include operating the processor to receive a spread OFDM signal having narrowband interference associated therewith, the spread OFDM signal comprising a plurality of subcarriers with data distributed among the subcarriers, operating the processor to excise the narrowband interference from the spread OFDM signal, and operating the processor to despread the spread OFDM signal after excising and based upon the excising to recover the data.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
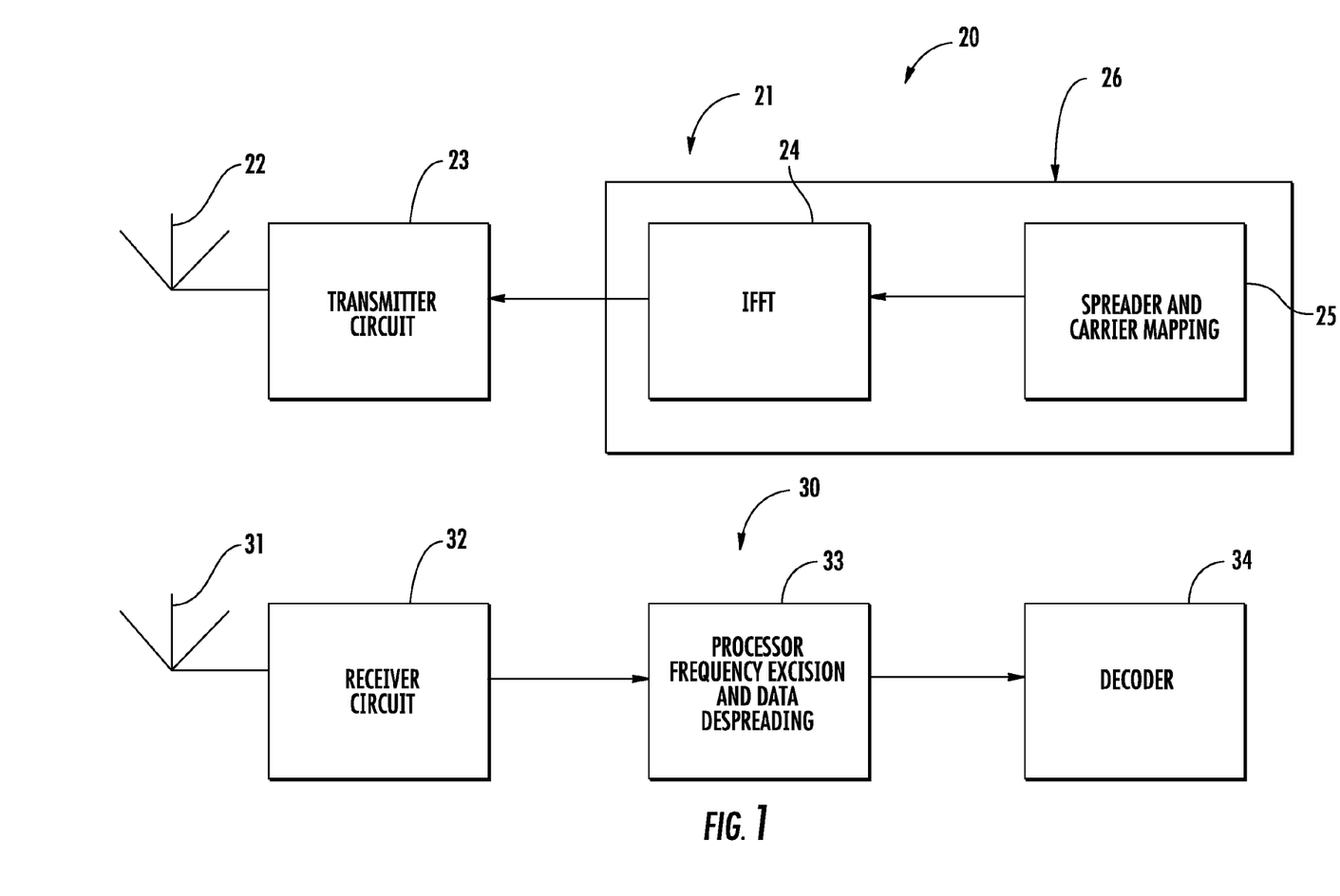
FIG. 1 is a schematic diagram of a communication system, according to the present invention.

Referring initially to FIG. 1, a communication system 20 according to the present embodiments is now described. The communication system 20 comprises a first communications device 21 comprising a wireless transmitter circuit 23, an antenna 22 coupled to the wireless transmitter circuit, and a processor 26 coupled to the wireless transmitter. The processor 26 illustratively includes an inverse fast Fourier transform (IFFT) module 24 coupled upstream of the wireless transmitter, and a spreader and carrier mapping module 25 coupled upstream of the IFFT module.

The processor 26 is configured to transmit a spread OFDM signal. The spread OFDM signal comprises a plurality of subcarriers with data distributed among the subcarriers. In other words, each of the subcarriers has data spread amongst the other subcarriers, which may include subcarrier locations normally not used, such as out of band frequencies. Thus, the data of each subcarrier is redundantly encoded in other subcarrier locations. For example, the spread OFDM signal may be based upon Walsh coding.

The communication system 20 includes a second communications device 30 communicating with the first communications device 21 over a communication channel (i.e. a linear communication channel) and comprising an antenna 31, a wireless receiver circuit 32 coupled to the antenna, a processor 33 coupled to the wireless receiver, and a decoder 34 coupled downstream from the processor. The processor 33 of the second communications device 30 is configured to receive the spread OFDM signal having narrowband interference associated therewith from the communication channel. In some embodiments, the processor 33 may be implemented on a field-programmable gate array (FPGA) or an application-specific integrated circuit (ASIC).

For example, the narrowband interference may comprise a rogue device (i.e. uncooperative or enemy device) performing a jamming operation to disable OFDM communications. In particular, the jamming operation may comprise positioning the narrowband interference (e.g. source comprising a high intensity jamming tone signal) on one of the pilot tones of the spread OFDM signal. Indeed, OFDM waveforms (including IEEE 802.11 (wireless local area network), IEEE 802.16 (Worldwide Interoperability for Microwave Access), Long Term Evolution, etc.) may be quite susceptible to narrowband interference, which results in a loss of information. This communication system 20 provides a technique to reduce the narrowband interference, resulting in an improvement in operating performance and reliability.

In United States Patent Application Publication No. 20080043861 to Moffatt (Moffatt), this approach presents the use of Walsh codes (or other orthogonal transforms) to spread/mix OFDM signals in the frequency domain in order to lessen the effects of interference. Advantageously, frequency-domain spreading can be applied to a conventional OFDM system. The addition of frequency-domain spreading requires a corresponding update to the channel equalization/ tracking function. Without updating the channel equalization algorithm, this operation will occur after despreading the received signal, and may only work for the case when the channel can be represented by a single fixed phase offset. Thus, a simple equalizer structure is inappropriate for more general (and realistic) cases, i.e. timing drift, or time dependent multipath. The problem then is to develop a generally applicable time dependent equalization approach for frequency domain spread/mixed OFDM and have that equalizer obtain cooperative information from the pre-processing narrowband signal excision. This present disclosure further enhances the concept of frequency domain spreading/mixing by incorporating the teachings for channel equalization and cooperative narrowband interference excision.

The processor 33 is configured to excise the narrowband interference from the spread OFDM signal, and despread the spread OFDM signal after excising and based upon the excising to recover the data. The second communications device 30 further comprises a decoder 34 coupled to the processor 33 for decoding the OFDM signal.

This processor 33 may automatically detect and remove narrowband interferers. In some embodiments, the processor 33 may have improved performance when the spread OFDM signal has a low modulation order, a low code rate, and/or a long interleaver depths. The processor 33 is able to excise the narrowband interference when the narrowband interference affects data carriers, as well as pilot carriers. Positively, the second communications device 30 may provide significant performance improvements in the link quality (e.g. an exemplary 45 dB signal improvement was attained in experiments). This exemplary performance was attained by Applicant using four OFDM streaming video links (three Commercial Off-The-Shelf (COTS) OFDM links and an FPGA implementation of the communications device 30 were presented with identical interference to signal profiles. Multicast Real-time Transport Protocol (RTP) streaming video was delivered over each link at a fixed modulation rate (½ rate coded QPSK) on four unique frequencies with interference placed into identical spectral locations for each RF link.

Figure 2:
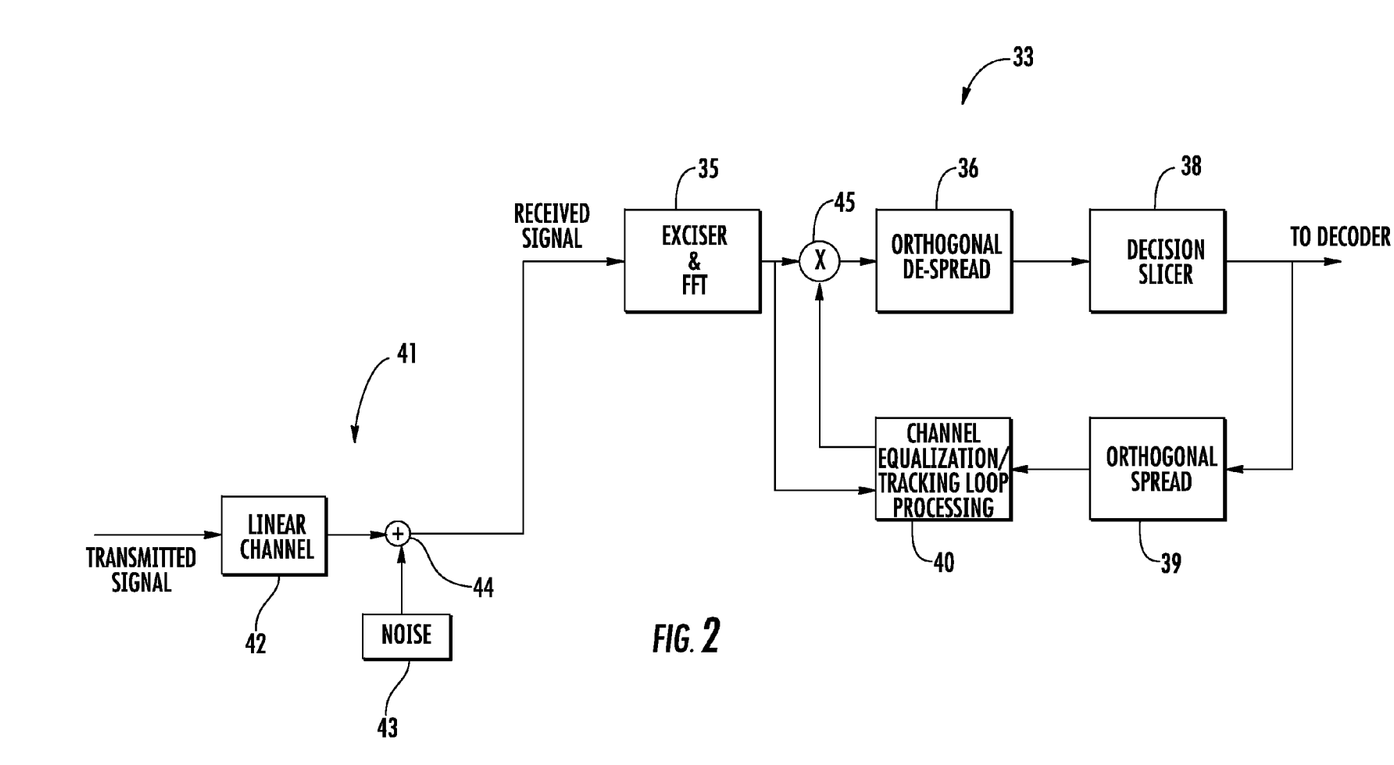
FIG. 2 is a schematic diagram of a simulated portion of the communication system of FIG. 1.

Referring now additionally to FIG. 2, the communication system 20 illustratively includes a communication channel 41 comprising a linear channel block 42, a noise block 43, and a summer 44 adding outputs of the linear channel block and the noise block to approximate a received signal over an actual linear communication channel. Also, the processor 33 is configured to excise the narrowband interference by setting one or more frequency bins to a set value. Of course, the frequency bins would cover the frequency band associated with the narrowband interference. In particular, the set value may comprise one of a zero value, a mean value (mean value of the signal value adjacent to the bin), and/or a random value. The set value may be selected based upon a baseband coding scheme of the spread OFDM signal.

The processor 33 illustratively includes an FFT block 35 configured to perform a frequency transformation on the spread OFDM signal (output of the FFT block is in a spread domain, physical frequency domain unequalized). In other words, the FFT block 35 converts the spread OFDM signal from the time domain to the frequency domain. The processor 33 also processes the frequency domain spread OFDM signal into a plurality of frequency bins (i.e. frequency histogram). The processor 33 illustratively includes an orthogonal despread block 36 configured to despread spread OFDM signal (output of the despread block is in a despread domain), and a decision slicer 38 coupled downstream from the despread block and configured to provide an output to the decoder 34 (output of the decision slicer is in a data domain).

In some embodiments, the orthogonal despread block 36 knows the excision effects on the spread OFDM signal. In particular, the orthogonal despread block 36 knows which frequency bins have been excised or altered, and can use this knowledge to improve reconstruction, compensating for the imperfect orthogonality terms.

The processor 33 illustratively includes an orthogonal spreader block 39 configured to respread the excised OFDM signal before the equalizing (output of the orthogonal spreader block is in a spread data domain). The orthogonal spreader block 39 may use Walsh transform, for example, and regenerates the spread domain representation of the demodulated data for use by the equalizer. This is the "decision" part of the decision directed feedback equalizer implementation, it is uniquely required to be in the spread domain.

The processor 33 illustratively includes a channel equalization/tracking loop processing block 40 configured to equalize the respread reference signal. Advantageously, the channel equalization/tracking loop processing block 40 operates in the spread domain rather than the de-spread domain, and outputs channel correction data to the multiplier 45.

Advantageously, the typical approaches may be only valid for a channel proportional to an identity matrix. In contrast, the communication system 20 may provide an approach valid for all general linear channels, i.e. having timing drift, multipath.

The processor 33 illustratively includes a multiplier 45 configured to multiply the equalizer coefficients in the spread domain with the frequency domain spread OFDM signal (output of the multiplier is in a spread domain, equalized). The channel equalization/tracking loop processing block 40 is configured to receive the frequency domain spread OFDM signal from the FFT block 35, and is configured to equalize the spread OFDM signal also based upon the excising. In some embodiments, the processor 33 is configured to equalize the spread OFDM signal using Decision Feedback Equalization (DFE).

In the communication system 20, the processor performs three major operations to reduce the effect of the narrowband interference: frequency excision in the second communications device 30, frequency domain signal spreading in the first and despreading in the second communications devices 20, 30, and equalization in the second communications device. Although in some embodiments, only one of these operations may be performed in the communication system 20, performance is improved by operation of at least two operations in the communication system.

In the illustrated embodiment, all three operations are performed within the second communications device 30. In some embodiments, the three operations may be performed independently of each other, i.e. they do not share information, but in other embodiments, they exchange information and enhance operation based upon this exchanged information. In particular, the frequency domain despreading in the second communications device 30 has the data regarding which portion of the operational frequency band has been excised. Also, with regards to equalization, in particular those embodiments that use DFE, the processor 33 applies typical DFE channel tracking approaches in the frequency spread domain and uses knowledge from a pre-processing narrowband excision function to manage equalizer tap updates. For cases where the excised locations are known to the equalizer, weighting and limiting can be used to prevent exponential growth of equalizer taps. Excision thresholds, percentages of spectrum removed and other measurement components can be shared with the equalizer to enable or disable almost any component of the feedback equalizer. The orthogonal spreader block 39 will always generate a fully occupied subcarrier allocation for the equalizer to use, independent of the number of subcarriers excised.

Figure 3:
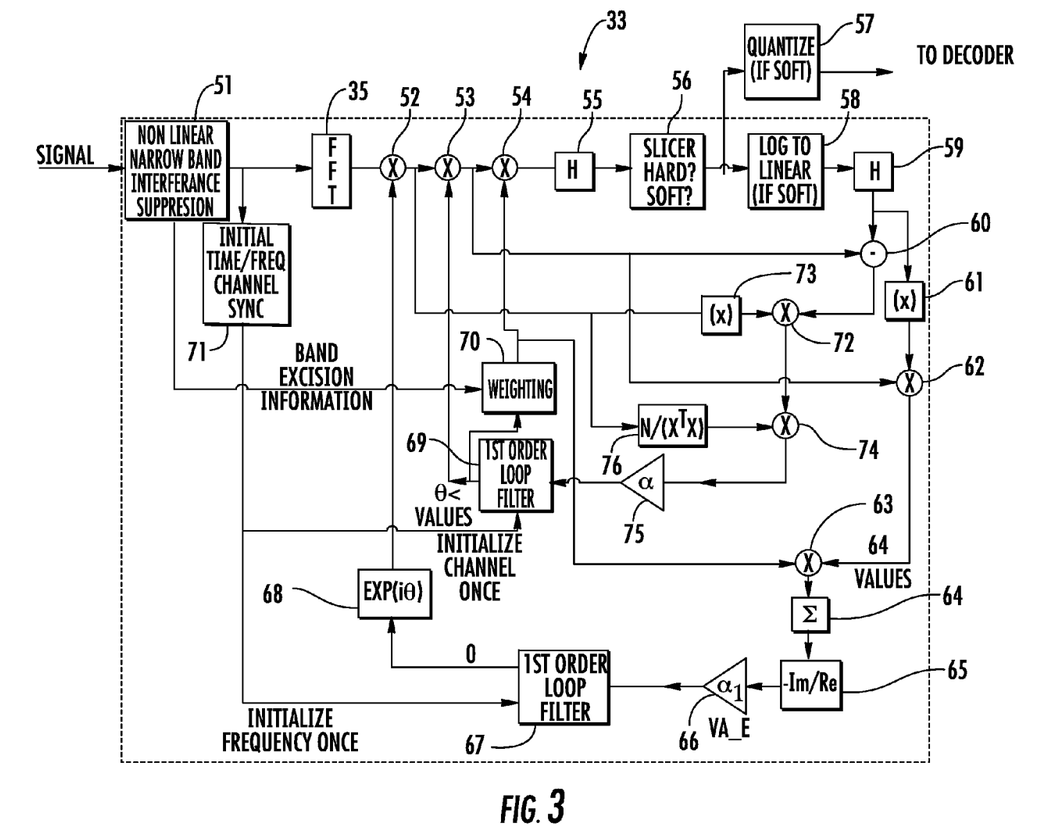
FIG. 3 is a schematic diagram of an example embodiment of the processor of the communication system of FIG. 1.

Referring now to FIG. 3, an exemplary embodiment of the processor 33 is described in detail. In this illustrated embodiment, the processor depicts a particular implementation to be used in the Anti-Jam feature for the Harris Software Defined Radio (as modified by the teachings herein), as available from the Harris Corporation of Melbourne, Fla., the assignee of the present application. The underlying modulation is IEEE 802.11a, modified by a 64 length Hadamard spreading function for a spreading factor just slightly larger than 1. It should be noted that the initial nonlinear narrowband interference suppression, among other things, is modified by the teachings herein. The design uses band excision information from this interference suppression pre-processor 51 to discount the effects of suppressed spectra. The design uses a double equalization tracking loop, an inner loop to track general channel variation over 64 carriers, and an outer phase locked loop (PLL) to track a universal phase offset. It handles hard or soft data bit decisions in the un-spread domain.

The processor 33 illustratively includes a nonlinear narrow band interference suppression block (i.e. the excision block) 51 configured to receive the spread OFDM signal and perform the aforementioned excision operation, and the FFT block 35 coupled downstream therefrom. The processor 33 illustratively includes first, second, and third multipliers 52-54 coupled sequentially downstream from the FFT block 35, and a first transfer function block 55 coupled to the third multiplier.

The processor 33 illustratively includes slicer/hard/soft decision block 56 coupled to the first transfer function block 55, a quantization (soft decision) block 57 coupled to the slicer/hard/soft decision block, and a log-to-linear block 58 also coupled to the slicer/hard/soft decision block. The processor 33 also illustratively includes a second transfer function block 59 coupled to the log-to-linear block 58, a subtractor 60 configured to receive outputs of the second transfer function block and the second multiplier 53, a power function block 61 coupled to the second transfer function, and a fourth multiplier 62 configured to multiply the output of the power function block and the second multiplier.

The processor 33 illustratively includes a fifth multiplier 63 configured to multiply the output of the fourth multiplier 62 and a weighting block 70, a summation block 64 coupled to the fifth multiplier, an −Im/Re block 65 coupled to the summation block, and an outer loop gain 66 coupled to the −Im/Re block. The processor 33 illustratively includes an initial time/frequency channel synchronization block 71 coupled to an output of the nonlinear narrow band interference suppression block 51, a first $1^{st}$ order loop filter block 67 coupled to outputs of the initial time/frequency channel synchronization block and the outer loop gain 66, and an exponential function block 68 coupled to the first $1^{st}$ order loop filter block and to the first multiplier 52. The processor 33 illustratively includes a second $1^{st}$ order loop filter block 69 coupled to the first $1^{st}$ order loop filter block 67, and the weighting block 70 configured to receive outputs from the second $1^{st}$ order loop filter block 69 and the initial time/frequency channel synchronization block 71.

The processor 33 illustratively includes a power function block 73 configured to operate on an output of the first multiplier 52, and a sixth multiplier 72 coupled to the subtractor 60 and the power function block. The processor 33 illustratively includes a seventh multiplier 74 coupled to the sixth multiplier 72, an $N/(X^T X)$ block 76 coupled to the output of the first multiplier 52, and a second loop gain 75 coupled between the seventh multiplier and the second $1^{st}$ order loop filter block 69. Leaving the second transfer function block 59, the outer loop path to a power function block 61 to the fourth multiplier 62 to the fifth multiplier 63 to the summation block 64 to the −Im/Re block 65 to the outer loop gain 66 to the first 1st order loop filter block to the exponential function block 68 generates the frequency offset compensation. Leaving the second transfer function block 59, the inner loop path to a subtractor 60 to the sixth multiplier 72 to the seventh multiplier 74 to the second loop gain 75 to the second 1st order loop filter block generates the channel equalization values to compensate for the channel multipath and timing drift (sample clock offset).

Advantageously, the communication system 20 provides an approach to use DFE equalization/tracking for frequency domain orthogonally spread/mixed OFDM and incorporate excised spectra information in the tracking loop. The communication system 20 also applies equalization in the spread domain as opposed to equalization in the unspread domain allowing equalization over general linear channels. Also, the communication system 20 also may broaden the applicability of teachings of Moffatt to non-trivial time-varying linear channels.

Figure 4:
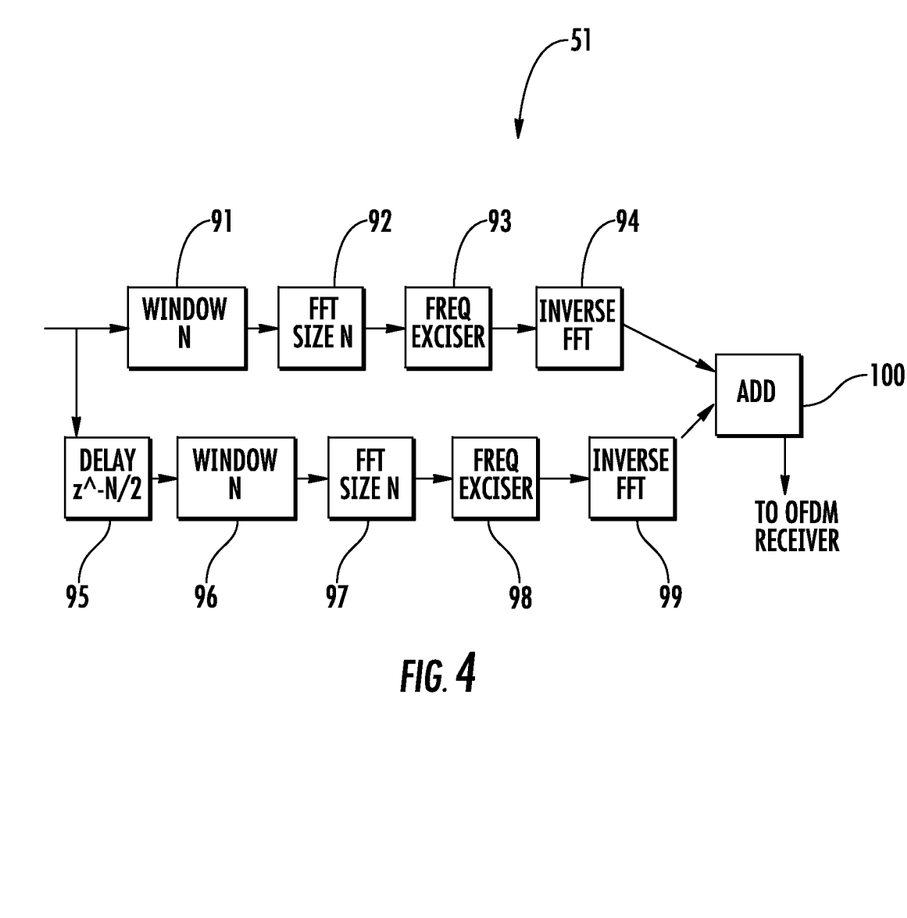
FIG. 4 is a schematic diagram of an example embodiment of the frequency excision process in the communication system of FIG. 1.

Referring now to FIG. 4, an exemplary embodiment of the frequency excision module 51 of the processor 33 is now described in detail. The frequency excision module 51 illustratively includes upper and lower processing paths. The upper processing path includes a window N block 91, an FFT size N block 92 coupled to the window N block, a frequency excision block 93 coupled to the FFT size N block, and an IFFT block 94 coupled to the frequency excision block. The lower processing path is similarly constituted to the upper path (blocks 96-99), but further includes a delay block 95 coupled upstream of the window N block 96. The frequency excision module 51 illustratively includes an adder block 100 coupled to the IFFT blocks 94, 99 of the upper and lower processing paths. This adder block 100 implements the overlap and add concept of the signal exciser.

Figure 5:
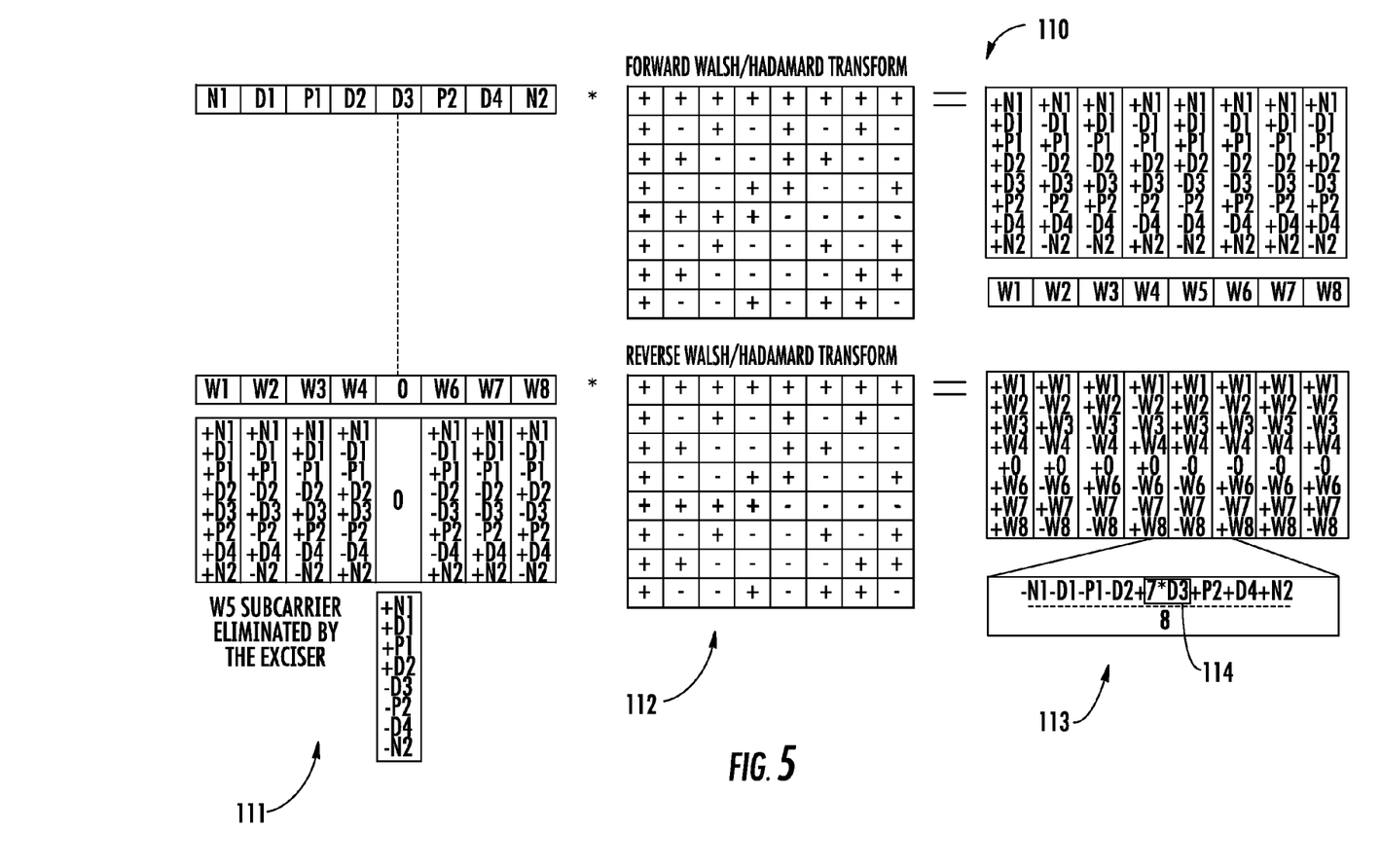
FIG. 5 is a schematic diagram of an example embodiment of the spreading and despreading process in the communication system of FIG. 1.
Figures 6, 7, 8:
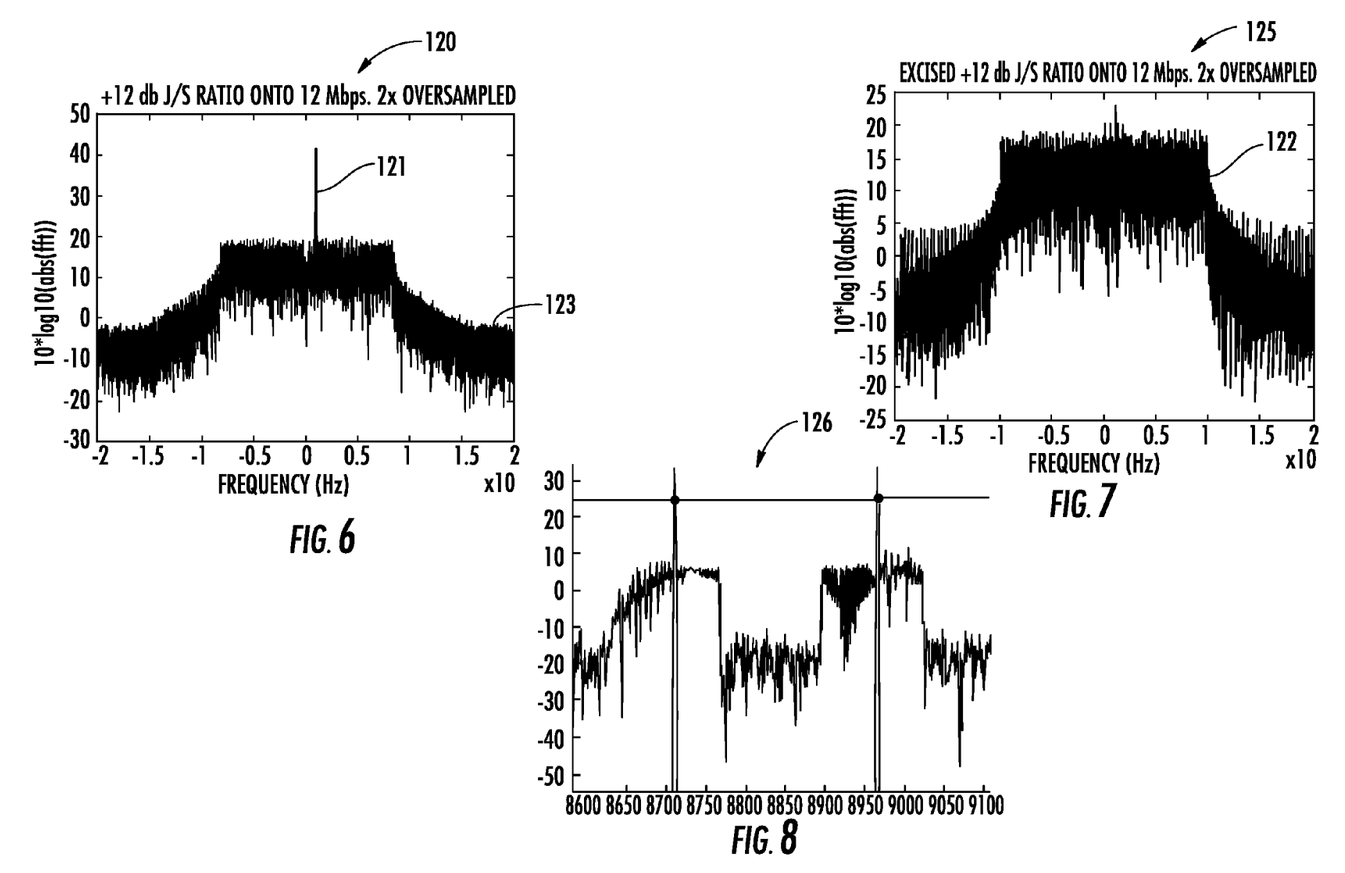
FIGS. 6-8 are diagrams showing the frequency excision process in the communication system of FIG. 1.
Figure 9A:
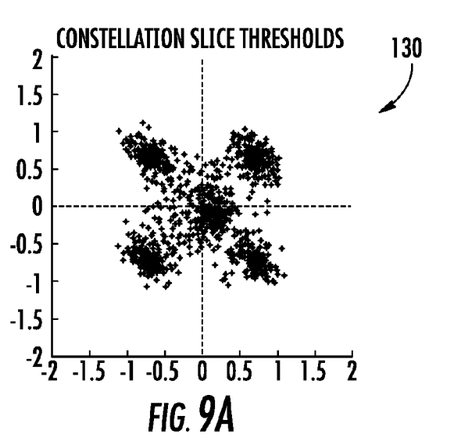
FIGS. 9A-9D are constellation diagrams showing the frequency excision/spreading code process in the communication system of FIG. 1.
Figure 9B:
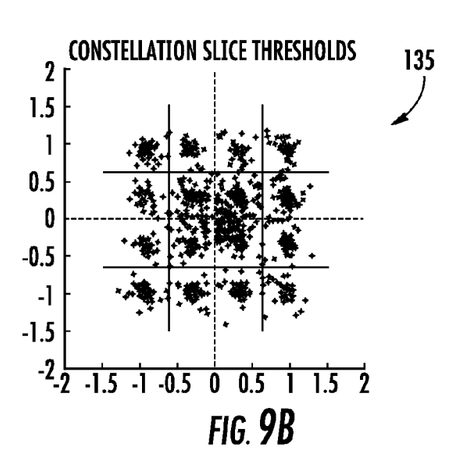
Figure 9C:
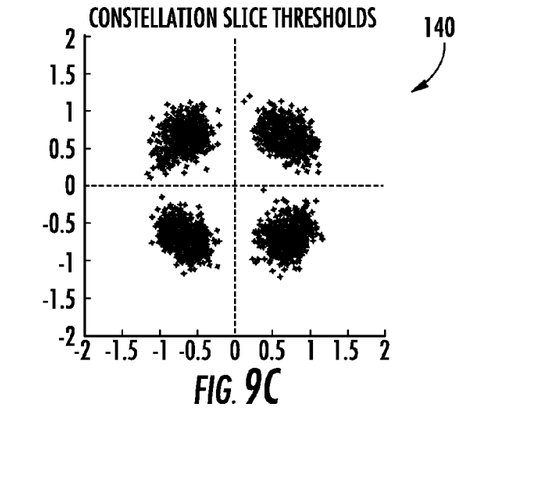
Figure 9D:
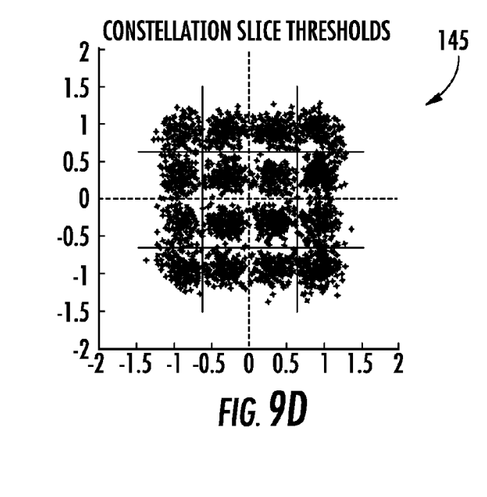
Figure 10:
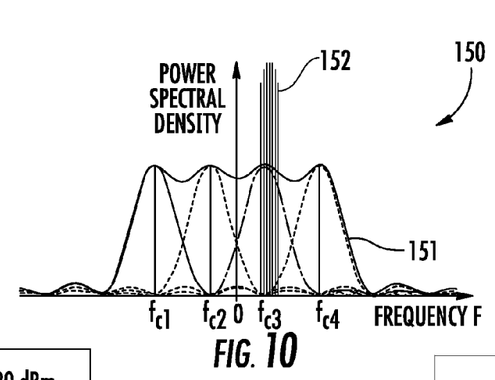
FIG. 10 is a diagram illustrating the OFDM spectrum with the narrowband interference in the communication system of FIG. 1.
Figure 11A:
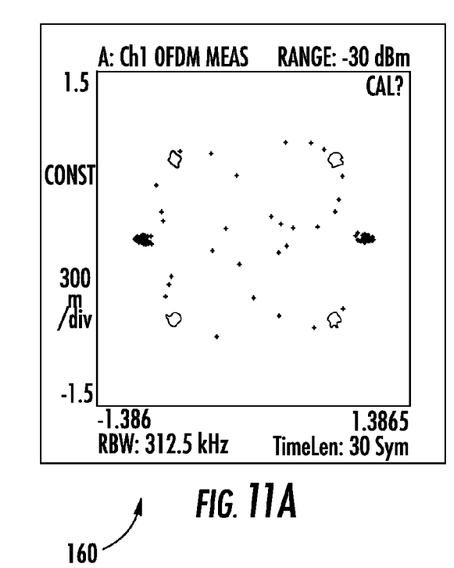
FIGS. 11A and 12A are constellation diagrams showing the effects of the narrowband interference on a data subcarrier and on a pilot subcarrier, respectively, in the communication system of FIG. 1.
Figure 11B:
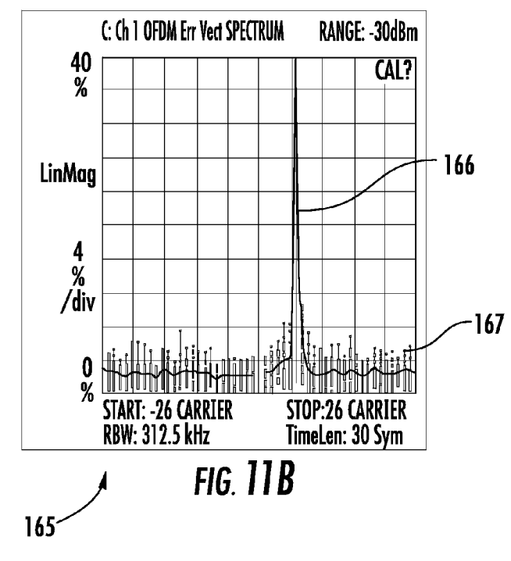
FIGS. 11B and 12B are spectrum diagrams showing the effects of the narrowband interference on a data subcarrier and on a pilot subcarrier, respectively, in the communication system of FIG. 1.
Figure 12A:
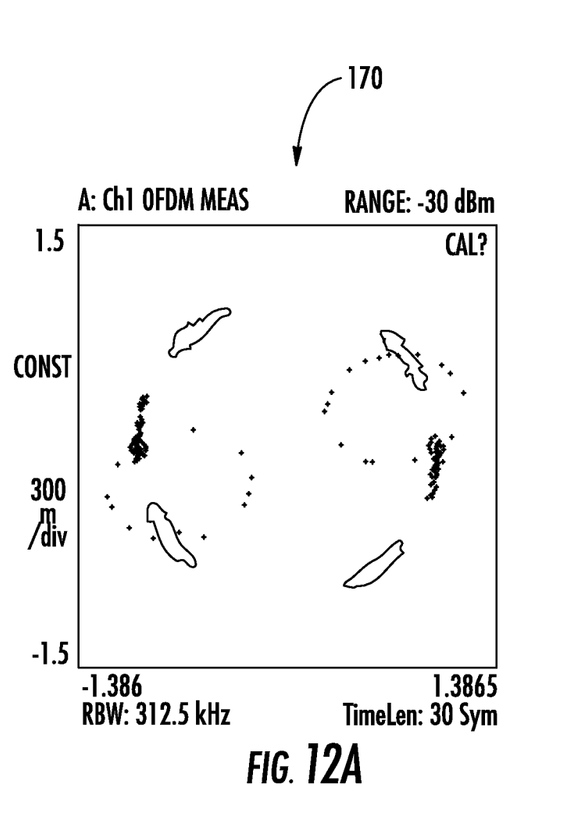
Figure 12B:
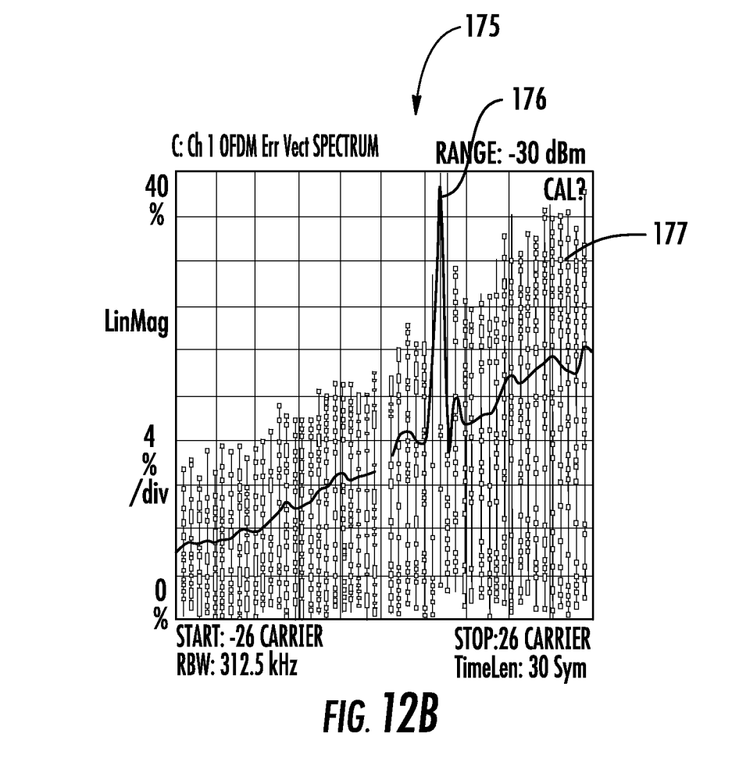

Referring now to FIG. 5, a diagram 110 illustrates an example embodiment of the excision operation and Walsh spreader coding in the communication system 20. In column 111, the W5 subcarrier is eliminated by the excision operation, and in column 112, the forward Walsh/Hadamard transform is performed. In column 113, the imperfect orthogonality of the processed signal is shown when the excision operation is enabled. In particular, term 114 highlights this imperfect orthogonality. The remaining numerator terms (all but those in term 114) make up the slicer noise component and, for large subcarrier counts, have a zero mean.

Referring now additionally to FIGS. 6-12B, several simulations regarding the second communications device 30 are now described. Diagrams 120, 125 show a frequency spectrum of the spread OFDM signal before and after the excision operation, respectively. Curve 123 illustratively includes a narrowband interference component 121, and curve 122 shows the resulting excised signal. Diagram 126 shows a frequency spectrum. An example excision algorithm could set a threshold, by which every frequency bin above said threshold would be eliminated by the excision operation. The threshold could be a set number of dB above the average spectral power.

Diagrams 130, 135 show constellation diagrams with excision enabled, but without the Walsh transform. The impact of excision alone shows constellation points clustered around the origin in Diagrams 130 and 135. Diagrams 140, 145 show constellation diagrams with excision enabled and with the Walsh transform also enabled. Advantageously, the signal symbol values have less noise when the Walsh transform is also enabled. Diagram 150 shows an example frequency spectrum including the narrowband interferer 152, and the OFDM spectrum 151. Also notice in Diagrams 140 and 145 that the constellation points clustered around the origin are eliminated. The signal slicing boundaries are much clearer. In exchange for eliminating the constellation points clustered around the origin, the error vector magnitude (size of the fuzzy balls) has increased. The primary contributor to the increase in error vector magnitude is the residual terms with near zero mean identified in 113 of FIG. 5.

Diagrams 160 and 165 show a constellation diagram and a frequency spectrum diagram, respectively, when a data carrier is jammed by the narrowband interferer. Curve 167 represents the carrier signals, and curve 166 represents the interferer. Diagrams 170 and 175 show a constellation diagram and a frequency spectrum diagram, respectively, when a pilot carrier is jammed by the narrowband interferer. Curve 177 represents the carrier signals, and curve 176 represents the interferer. When a data carrier is jammed by the narrowband interferer, curve 166 shows that only the data carrier of interest has been impacted while the coherent pilots along the x-axis remain in their preferred locations and the other data carriers remain in their preferred QPSK constellation locations. When a pilot subcarrier is jammed by the narrowband interferer, curve 170 shows that not only is the coherent pilot of interest affected but it has also corrupted the phase and timing drift (sample clock offset) compensation. Now all of the data carriers have phase rotation introduces as well as the coherent pilots are no longer locked to the x-axis.

Another aspect is directed to a method of operating a communications device 30 comprising a wireless receiver 32, and a processor 33 coupled to the wireless receiver. The method may include operating the processor 33 to receive a spread OFDM signal having narrowband interference associated therewith, the spread OFDM signal comprising a plurality of subcarriers with data distributed among the subcarriers, operating the processor to excise the narrowband interference from the spread OFDM signal, and operating the processor to despread the spread OFDM signal after excising and based upon the excising to recover the data.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications device comprising:
   a wireless receiver; and
   a processor coupled to the wireless receiver and configured to
      receive a spread orthogonal frequency-division multiplexing (OFDM) signal having narrowband interference associated therewith, the spread OFDM signal comprising a plurality of subcarriers with data distributed among the subcarriers,
      excise the narrowband interference from the spread OFDM signal based upon first and second parallel processing paths, each parallel processing path including an excision operation,
      despread the spread OFDM signal after excising and based upon band excision information from the excision operation, and
      equalize the spread OFDM signal also based upon the band excision information from the excision operation, the band excision information comprising a spectrum removal percentage.

2. The communications device of claim 1 wherein said processor is configured to equalize the spread OFDM signal by at least selectively enabling at least one equalizer tap using the band excision information.

3. The communications device of claim 1 wherein said processor is configured to respread the excised OFDM signal before the equalizing.

4. The communications device of claim 1 wherein said processor is configured to equalize the spread OFDM signal using decision feedback equalization.

5. The communications device of claim 1 further comprising a decoder coupled to said processor.

6. The communications device of claim 1 wherein said processor is configured to perform a frequency transformation on the spread OFDM signal so that the spread OFDM signal is processed in a plurality of frequency bins.

7. The communications device of claim 6 wherein said processor is configured to excise the narrowband interference by setting at least one frequency bin to a set value.

8. The communications device of claim 7 wherein said set value comprises one of a zero value, a mean value, and a random value.

9. The communications device of claim 1 wherein the spread OFDM signal is based upon Walsh coding.

10. A communication system comprising:
    a first communications device comprising a wireless transmitter, and a processor coupled to said wireless transmitter and configured to transmit a spread orthogonal frequency-division multiplexing (OFDM) signal; and
    a second communications device communicating with said first communications device over a communication channel and comprising a wireless receiver, and a processor coupled to said wireless receiver and configured to
       receive the spread OFDM signal having narrowband interference associated therewith from the communication channel, the spread OFDM signal comprising a plurality of subcarriers with data distributed among the subcarriers,
       excise the narrowband interference from the spread OFDM signal based upon first and second parallel processing paths, each parallel processing path including an excision operation,
       despread the spread OFDM signal after excising and based upon band excision information from the excision operation, and
       equalize the spread OFDM signal also based upon the band excision information from the excision operation, the band excision information comprising a spectrum removal percentage.

11. The communication system of claim 10 wherein said processor of said second communications device is configured to equalize the spread OFDM signal by at least selectively enabling at least one equalizer tap using the band excision information.

12. The communication system of claim 10 wherein said processor of said second communications device is configured to respread the excised OFDM signal before the equalizing.

13. The communication system of claim 10 wherein said processor of said second communications device is configured to equalize the spread OFDM signal using decision feedback equalization.

14. The communication system of claim 10 wherein said second communications device comprises a decoder coupled to said processor.

15. The communication system of claim 10 wherein said processor of said second communications device is configured to perform a frequency transformation on the spread OFDM signal so that the spread OFDM signal is processed in a plurality of frequency bins.

16. The communication system of claim 15 wherein said processor of said second communications device is configured to excise the narrowband interference by setting at least one frequency bin to a set value.

17. A method of operating a communications device comprising a wireless receiver, and a processor coupled to the wireless receiver, the method comprising:

operating the processor to receive a spread orthogonal frequency-division multiplexing (OFDM) signal having narrowband interference associated therewith, the spread OFDM signal comprising a plurality of subcarriers with data distributed among the subcarriers;

operating the processor to excise the narrowband interference from the spread OFDM signal based upon first and second parallel processing paths, each parallel processing path including an excision operation;

operating the processor to despread the spread OFDM signal after excising and based upon band excision information from the excision operation; and operating the processor to equalize the spread OFDM signal also based upon the band excision information from the excision operation, the band excision information comprising a spectrum removal percentage.

18. The method of claim 17 further comprising operating the processor to equalize the spread OFDM signal by at least selectively enabling at least one equalizer tap using the band excision information.

19. The method of claim 17 further comprising operating the processor to respread the excised OFDM signal before the equalizing.

20. The method of claim 17 further comprising operating the processor to equalize the spread OFDM signal using decision feedback equalization.

21. The method of claim 17 further comprising operating the processor to perform a frequency transformation on the spread OFDM signal so that the spread OFDM signal is processed in a plurality of frequency bins.

22. The method of claim 21 further comprising operating the processor to excise the narrowband interference by setting at least one frequency bin to a set value.

23. The method of claim 22 wherein the set value comprises one of a zero value, a mean value, and a random value.

* * * * *